United States Patent
Begen

(10) Patent No.: US 8,965,809 B1
(45) Date of Patent: Feb. 24, 2015

(54) RESTRICTED PRINTING OF POSTAGE WITH LAYOUT CONSTRAINTS IN A BROWSER

(75) Inventor: Geoffrey C. Begen, Lake Forest, CA (US)

(73) Assignee: Stamps.com Inc., El Segundo, CA (US)

( * ) Notice: Subject to any disclaimer, the term of this patent is extended or adjusted under 35 U.S.C. 154(b) by 788 days.

(21) Appl. No.: 12/470,355

(22) Filed: May 21, 2009

(51) Int. Cl.
| | | |
|---|---|---|
| *G06F 17/30* | (2006.01) | |
| *G07B 17/04* | (2006.01) | |
| *G01G 19/00* | (2006.01) | |
| G06Q 20/02 | (2012.01) | |
| H04N 7/16 | (2011.01) | |
| G06F 21/00 | (2013.01) | |
| G06F 7/00 | (2006.01) | |

(52) U.S. Cl.
CPC ............... *G06F 17/30* (2013.01); *G06Q 20/02* (2013.01); *H04N 7/16* (2013.01); *G06F 21/00* (2013.01); *G06F 7/00* (2013.01); *G07B 17/04* (2013.01); *G01G 19/005* (2013.01)
USPC .............................. 705/60; 705/54; 177/25.15

(58) Field of Classification Search
CPC ............. G06F 7/04; G06F 7/06; G06F 17/30; G06F 21/00; H04N 7/16; H04N 2201/3271; G06Q 20/02; G06Q 20/00; G07B 17/04; G01G 19/005
USPC .............................. 726/31; 705/60, 54; 725/31
See application file for complete search history.

(56) References Cited

U.S. PATENT DOCUMENTS

| | | | | |
|---|---|---|---|---|
| 4,184,628 A | * | 1/1980 | Schultz ........................ | 229/68.1 |
| 4,325,440 A | * | 4/1982 | Crowley et al. ............. | 177/25.15 |
| 4,393,640 A | * | 7/1983 | Cole et al. ........................ | 53/69 |
| 4,535,419 A | * | 8/1985 | Dlugos et al. .................. | 705/407 |
| 4,595,984 A | * | 6/1986 | Daniels ......................... | 705/402 |
| 4,725,718 A | | 2/1988 | Sansone et al. | |
| 4,739,486 A | * | 4/1988 | Soderberg et al. ............ | 705/410 |
| 4,831,555 A | | 5/1989 | Sansone et al. | |
| 4,839,813 A | * | 6/1989 | Hills et al. .................... | 705/404 |
| 4,868,757 A | * | 9/1989 | Gil ................................ | 705/406 |
| 5,509,109 A | * | 4/1996 | Kim et al. ..................... | 358/1.15 |
| 5,606,507 A | | 2/1997 | Kara | |
| 5,629,980 A | | 5/1997 | Stefik et al. | |
| 5,636,292 A | | 6/1997 | Rhoads | |

(Continued)

FOREIGN PATENT DOCUMENTS

| | | | |
|---|---|---|---|
| EP | 1916628 A1 | | 4/2008 |
| EP | 1916628 A1 | * | 4/2008 |

(Continued)

OTHER PUBLICATIONS

Merriam-Webster, "postal", 2014.*

(Continued)

*Primary Examiner* — O. C. Vostal

(74) *Attorney, Agent, or Firm* — Fulbright & Jaworski LLP

(57) ABSTRACT

The present invention is directed to systems and methods which restrict the use of Value Bearing Indicia (VBI) such that a general purpose interface application can be used to securely and/or precisely print VBI. A method and/or system of embodiments of the invention, includes a general purpose interface application being operated on a general purpose processor to request VBI, and in response to that request, receiving a content object comprising both the VBI and defined parameters which are controlled such that the general purpose interface application's use of the VBI is restricted.

25 Claims, 8 Drawing Sheets

(56) References Cited

U.S. PATENT DOCUMENTS

| | | | |
|---|---|---|---|
| 5,666,284 A | 9/1997 | Kara | |
| 5,682,318 A | 10/1997 | Kara | |
| 5,717,597 A | 2/1998 | Kara | |
| 5,737,426 A * | 4/1998 | Brookner et al. | 380/51 |
| 5,774,886 A | 6/1998 | Kara | |
| 5,778,076 A | 7/1998 | Kara et al. | |
| 5,787,406 A * | 7/1998 | Arsenault et al. | 705/410 |
| 5,796,834 A | 8/1998 | Whitney et al. | |
| 5,801,364 A | 9/1998 | Kara et al. | |
| 5,801,944 A | 9/1998 | Kara | |
| 5,812,991 A | 9/1998 | Kara | |
| 5,819,240 A | 10/1998 | Kara | |
| 5,822,739 A | 10/1998 | Kara | |
| 5,982,506 A | 11/1999 | Kara | |
| 5,983,209 A | 11/1999 | Kara | |
| 5,999,967 A * | 12/1999 | Sundsted | 709/206 |
| 6,158,003 A | 12/2000 | Kara | |
| 6,199,055 B1 | 3/2001 | Kara et al. | |
| 6,208,980 B1 | 3/2001 | Kara | |
| 6,233,568 B1 | 5/2001 | Kara | |
| 6,249,777 B1 | 6/2001 | Kara et al. | |
| 6,470,327 B1 * | 10/2002 | Carroll et al. | 705/401 |
| 6,650,831 B1 * | 11/2003 | Thompson | 396/6 |
| 6,671,813 B2 * | 12/2003 | Ananda | 726/3 |
| 7,013,589 B2 * | 3/2006 | Dickinson et al. | 40/312 |
| 7,133,846 B1 * | 11/2006 | Ginter et al. | 705/54 |
| 7,149,726 B1 | 12/2006 | Lingle et al. | |
| 7,180,616 B2 * | 2/2007 | Miyoshi et al. | 358/1.15 |
| 7,190,467 B2 * | 3/2007 | Simpson et al. | 358/1.1 |
| 7,194,957 B1 * | 3/2007 | Leon et al. | 101/485 |
| 7,200,858 B1 * | 4/2007 | Benjamin et al. | 725/90 |
| 7,251,632 B1 | 7/2007 | Ogg et al. | |
| 7,290,705 B1 * | 11/2007 | Shin | 235/381 |
| 7,315,845 B2 * | 1/2008 | Elliott | 705/408 |
| 7,353,213 B2 * | 4/2008 | Ryan et al. | 705/401 |
| 7,383,194 B2 * | 6/2008 | Heiden et al. | 705/60 |
| 7,400,425 B2 * | 7/2008 | Parry | 358/1.15 |
| 7,433,849 B2 * | 10/2008 | Cordery et al. | 705/401 |
| 7,474,762 B2 * | 1/2009 | Dimeski | 382/101 |
| 7,475,041 B2 * | 1/2009 | Pintsov et al. | 705/50 |
| 7,784,090 B2 * | 8/2010 | Lord et al. | 726/7 |
| 7,873,572 B2 * | 1/2011 | Reardon | 705/39 |
| 7,933,845 B1 * | 4/2011 | Leon et al. | 705/401 |
| 8,359,332 B1 | 1/2013 | Diamond et al. | |
| 8,446,621 B2 * | 5/2013 | Nuggehalli et al. | 358/1.15 |
| 2001/0000359 A1 | 4/2001 | Schreiber et al. | 713/201 |
| 2001/0039625 A1 * | 11/2001 | Ananda | 713/202 |
| 2001/0044783 A1 * | 11/2001 | Weisberg et al. | 705/62 |
| 2001/0049703 A1 * | 12/2001 | Miyoshi et al. | 707/527 |
| 2002/0023057 A1 * | 2/2002 | Goodwin et al. | 705/50 |
| 2002/0026487 A1 * | 2/2002 | Ogilvie et al. | 709/206 |
| 2002/0029202 A1 * | 3/2002 | Lopez | 705/406 |
| 2002/0046182 A1 * | 4/2002 | Bator et al. | 705/60 |
| 2002/0069069 A1 * | 6/2002 | Tagg | 709/218 |
| 2002/0069365 A1 * | 6/2002 | Howard et al. | 713/201 |
| 2002/0083020 A1 * | 6/2002 | Leon | 705/401 |
| 2002/0116508 A1 * | 8/2002 | Khan et al. | 709/229 |
| 2002/0178354 A1 | 11/2002 | Ogg et al. | |
| 2003/0028801 A1 * | 2/2003 | Liberman et al. | 713/200 |
| 2003/0035138 A1 * | 2/2003 | Schilling | 358/1.15 |
| 2003/0037008 A1 * | 2/2003 | Raju et al. | 705/60 |
| 2003/0038965 A1 * | 2/2003 | Simpson et al. | 358/1.15 |
| 2003/0078893 A1 * | 4/2003 | Shah et al. | 705/60 |
| 2003/0088518 A1 * | 5/2003 | Kirk et al. | 705/62 |
| 2003/0098581 A1 * | 5/2003 | Cundiff et al. | 283/116 |
| 2003/0130954 A1 * | 7/2003 | Carr et al. | 705/60 |
| 2003/0167179 A1 * | 9/2003 | Briley | 705/1 |
| 2003/0167239 A1 * | 9/2003 | Davis | 705/404 |
| 2003/0178328 A1 * | 9/2003 | Williamson | 206/204 |
| 2003/0179253 A1 * | 9/2003 | Manduley | 347/2 |
| 2003/0220887 A1 * | 11/2003 | Stickler et al. | 705/401 |
| 2003/0233462 A1 * | 12/2003 | Chien | 709/229 |
| 2004/0015404 A1 * | 1/2004 | McCarthy | 705/26 |
| 2004/0073666 A1 * | 4/2004 | Foster et al. | 709/225 |
| 2004/0078348 A1 * | 4/2004 | Blair et al. | 705/408 |
| 2004/0128516 A1 * | 7/2004 | Okamoto et al. | 713/179 |
| 2004/0186811 A1 * | 9/2004 | Gullo et al. | 705/402 |
| 2004/0211828 A1 * | 10/2004 | Wilkie | 235/375 |
| 2004/0215583 A1 * | 10/2004 | Elliott | 705/408 |
| 2004/0230825 A1 | 11/2004 | Shepherd et al. | |
| 2004/0236648 A1 * | 11/2004 | Yip et al. | 705/30 |
| 2004/0243523 A1 * | 12/2004 | Herbert | 705/408 |
| 2005/0033690 A1 * | 2/2005 | Antognini et al. | 705/40 |
| 2005/0065892 A1 | 3/2005 | Ryan et al. | |
| 2005/0138469 A1 * | 6/2005 | Ryan et al. | 714/20 |
| 2005/0162685 A1 * | 7/2005 | Heiles et al. | 358/1.15 |
| 2005/0187885 A1 * | 8/2005 | Allen et al. | 705/401 |
| 2005/0228760 A1 * | 10/2005 | Monsen et al. | 705/401 |
| 2005/0235351 A1 | 10/2005 | Seltzer et al. | |
| 2006/0072174 A1 * | 4/2006 | Koike et al. | 358/537 |
| 2006/0095346 A1 * | 5/2006 | Gambhir | 705/28 |
| 2006/0098650 A1 * | 5/2006 | Beninato et al. | 370/389 |
| 2006/0101121 A1 * | 5/2006 | Senechalle | 709/206 |
| 2006/0161506 A1 * | 7/2006 | Stumm et al. | 705/408 |
| 2006/0190418 A1 * | 8/2006 | Huberty et al. | 705/402 |
| 2006/0259964 A1 * | 11/2006 | Maldonado et al. | 726/16 |
| 2006/0290976 A1 * | 12/2006 | Ko et al. | 358/1.15 |
| 2007/0022059 A1 * | 1/2007 | Heiden | 705/401 |
| 2007/0073628 A1 * | 3/2007 | Pauly et al. | 705/62 |
| 2007/0097400 A1 * | 5/2007 | Yasui et al. | 358/1.13 |
| 2007/0174213 A1 * | 7/2007 | Whitehouse et al. | 705/401 |
| 2007/0177920 A1 * | 8/2007 | Katano et al. | 400/76 |
| 2007/0282753 A1 * | 12/2007 | Schwartz et al. | 705/62 |
| 2008/0092239 A1 * | 4/2008 | Sitrick et al. | 726/27 |
| 2008/0209533 A1 | 8/2008 | Abrams et al. | |
| 2008/0294726 A1 * | 11/2008 | Sidman | 709/206 |
| 2009/0012915 A1 * | 1/2009 | Meyer et al. | 705/402 |
| 2009/0125387 A1 * | 5/2009 | Mak et al. | 705/14 |
| 2009/0141895 A1 | 6/2009 | Anderson et al. | |
| 2009/0245521 A1 | 10/2009 | Vembu et al. | |
| 2009/0327409 A1 | 12/2009 | Mayer et al. | |
| 2010/0046029 A1 * | 2/2010 | Suzuki et al. | 358/1.15 |
| 2012/0054822 A1 | 3/2012 | Dvorak et al. | |
| 2013/0125248 A1 * | 5/2013 | Whitten et al. | 726/28 |

FOREIGN PATENT DOCUMENTS

| | | | |
|---|---|---|---|
| WO | WO-2008/049580 A1 | 5/2008 | |
| WO | WO 2008049580 A1 * | 5/2008 | |

OTHER PUBLICATIONS

Merriam-Webster, "postage" 2014.*
Merriam-Webster, "indicia", 2014.*
USPS, "Information-Based Indicia Program (IBIP), Performance Criteria for Information-Based Indicia and Security Architecture for Open IBI Postage Evidencing Systems (PCIBI-O)", 2000.*
Wikipedia, "Franking", 2014.*
http://www.deutschepost.de/dpag?tab=1&skin=hi&check=yes &lang=de_EN&xmlFile=link1017124_1009569; "Stampit—The license for postage printing," and "Stampit Web," pp. 2, printed May 21, 2009.
http://www.adobe.com/enterprise/pdfs/ger_deutschePost.odf; "Deutsche Post uses Adobe solutions and the Web to enable reliable printing of pre-paid stamps for parcel delivery," pp. 2, Sep. 2005.
U.S. Appl. No. 11/353,690, Salim G. Kara.
English Translation of WO 2008/049580 to Mayer Oct. 2007.
English Translation of EP1916628 to Mayer Oct. 2006.

* cited by examiner

RESTRICTED PRINTING OF POSTAGE WITH LAYOUT CONSTRAINTS IN A BROWSER

CROSS-REFERENCE TO RELATED APPLICATIONS

This application is related to co-pending and commonly assigned U.S. patent application Ser. No. 12/103,465 entitled "SYSTEMS AND METHODS FOR PROTECTING CONTENT WHEN USING A GENERAL PURPOSE USER INTERFACE APPLICATION", filed on Apr. 15, 2008, and U.S. patent application Ser. No. 11/353,690 entitled "SYSTEM AND METHOD FOR VALIDATING POSTAGE", filed on Feb. 14, 2006, the disclosures of which are hereby incorporated herein by reference.

TECHNICAL FIELD

The invention relates generally to protecting value bearing indicia and, more particularly, to controlling the use of value bearing indicia when using a general purpose user interface application.

BACKGROUND OF THE INVENTION

The ability for a user to purchase and print a Value Bearing Indicia at a home or business has been available for a number of years. VBI is indicia attached to, printed on, or otherwise evidenced on a ticket, voucher, envelope, letter, shipping label, parcel, package, container, box, or postcard which evidences proof of payment for a service. A VBI could be either a full VBI or a VBI lite (also known as a reduced VBI). The information encoded into full VBI has typically included sufficient information to authenticate an indicium from information on the face on the postal item. In contrast, a VBI lite includes less information that a full VBI but should include enough data to allow for association of the VBI lite with the full data typically needed to form a full VBI.

Initially, postage meters using tamper resistant mechanical postage value "vaults" were widely used for printing postage indicia commonly referred to as meter stamps. In more recent years, electronic systems were developed using electronic postage value vaults to provide improved security. The evolution of such electronic systems has ultimately led to the development of postage metering systems which allow general purpose processor based systems (e.g. personal computers) to access remote metering servers using communications such as the public switched telephone network (PSTN), local area networks (LANs), wide area networks (WANs), and the Internet. For example, U.S. Pat. No. 6,249,777 entitled "System and Method for Remote Postage Metering," U.S. Pat. No. 6,671,813 entitled "Secure On-Line PC Postage Metering System," and U.S. Pat. No. 7,149,726 entitled "Online Value Based Item Printing," the disclosures of which are incorporated herein by reference, show various electronic VBI metering systems facilitating remote metering operations.

In providing remote metering operations, electronic metering systems typically implement specialized metering technology both at the user site and the remote site (e.g., a centralized metering site). When a user printed postage indicia from a general purpose processor, specialized metering technology in the form of secure postage metering hardware and/or secure metering software had to be installed on the general purpose processor to deter fraud, prevent value theft, and provide for precise printing. When compared to the original mechanical metering systems, the secure metering hardware and/or software installed on a user computer made the printing of postage indicia more available and user friendly for the common user. However, requiring a user to acquire and install specialized metering hardware and/or software technology may introduce disadvantages, such as increased costs, reduced availability, and limited system use.

For example, the specialized hardware and/or software may require purchase of hardware and/or software supporting technology which increases costs to either the VBI purchaser or VBI provider. Further, the hardware and/or software may malfunction during the installation process or later when in use. Once the hardware and/or software are properly installed, the purchaser and provider are further inconvenienced by having to maintain software updates. Moreover, every time user computers are changed or reformatted the specialized hardware and/or software may need to be reinstalled. In a business setting, the need to keep up with the installations, updates, and reinstallations may overburden the business' Information Technology (IT) department. Such disadvantages in the current methods used in online postage indicia purchasing may deter users from using online VBI purchasing services.

Although the current state of technology provides for the use of a general purpose interface application, such as a web browser application (e.g., INTERNET EXPLORER™ available from Microsoft Corporation, NETSCAPE™ available from Netscape Communications, SAFARI™ available from Apple Inc., and FIREFOX™ available from Mozilla Corporation) in various computer based networking operations, the open nature of such general purpose interface applications do not provide the high level of security desired for metering operations. For instance, because general purpose interface applications generally facilitate user freedom with respect to printing, copying, print margin setting, etcetera, even the most casual user could defraud the VBI provider by purchasing a single VBI and using the open nature of a general purpose interface application to copy and/or print the same VBI multiple times.

For example, a casual user could use the print menu (e.g., FILE|PRINT) typically available in general purpose interface applications in order to print multiple copies of VBI acquired using such general purpose interface applications. Similarly, the user could manipulate a pointing device (e.g., mouse) in order to select and copy VBI for pasting into another software application for duplicating, modification, storing, etc. Traditionally, general purpose interface applications do not provide means by which the VBI provider can control the user's activities once the VBI is sent to the user's general purpose interface application. It is due to this lack of control that VBI providers traditionally desire specialized software be installed on the user's computer.

Another problem general purpose interface applications cause when printing VBI is misprints. When printing VBI on a sheet of labels, the proper placement of each printed VBI is essential. For example, when printing a plurality of VBI on a sheet of labels holding multiple kiss cut labels, the printer must precisely print each indicium such that no indicium overlaps into a neighboring label. Otherwise, when the labels are removed from the sheet, an indicium would be torn into pieces because it was printed across more than one label. Likewise, when printing VBI directly onto an envelope or postcard, the printer should print the indicium in the upper right hand corner of the envelope or postcard, or else, the VBI may not be acceptable.

Traditionally, general purpose interface applications (e.g. web browsers) have not given the VBI provider control over the printing location to a precise enough degree to ensure the VBI will be printed in the proper location. This is because general purpose interface applications insert headers, footers, or placement parameters when printing which may affect the printing location of the item being printed. To maintain the desired printing precision, postage metering systems generally have not employed general purpose interface applications, but instead, utilize specialized metering software and/or hardware to control the printing and provide location controls for accurate VBI printing.

More recently, printing simple shipping labels without VBI has been possible through a general purpose interface application via a web page. However, VBI is quite different from shipping labels without VBI, and it is those differences that traditionally prevented general purpose interfacing applications from being used to print VBI in the past.

One reason users have been able to print shipping labels without VBI using general purpose interface applications is the lenient printing constraints required for shipping label forms. Typically, a shipping label without VBI form is simply a 4"×6" rectangle printed anywhere on a piece of plain paper. Positioning is not important. If the browser cannot precisely position the shipping label on the page or includes its own headers and footers, the shipping label is still usable. In contrast to shipping labels without VBI, VBI benefit from precise printing locations. Users desire VBI be printed on envelopes, postcards, and sheets of labels which as described above, benefit from precise printing. Because general purpose interface applications have generally not been able to precisely print VBI, general purpose interface applications have not been used in printing VBI.

Further, shipping labels without VBI differ from VBI because there is no need to control the number of times a shipping label is printed or copied. Shipping labels without VBI often include billing numbers ensuring that each time a shipping label bearing that particular billing number is used the user is billed for the use of the shipping label. Therefore, service providers need not restrict the copying or duplicative printing of shipping labels because the user will be charged for each duplicative use. While the parcel is in transit, the shipping carrier scans 100% of the shipping labels to determine from the label's billing number whether the label has previously been used. If so, duplication and/or fraud are detected and the carrier can choose not to ship the parcels. Different from shipping labels without VBI, VBI may not be 100% scanned by the shipping carriers. Therefore, VBI usually lack the after-printing fraud detection available on shipping labels. Accordingly, stricter pre-printing security is desired to ensure the VBI are not printed more then once or copied into another application, and general purpose interface applications have traditionally not been capable of providing the desired pre-printing security.

Moreover, shipping labels without VBI are typically much larger than VBI. A typical shipping label is a 4"×6," and shipping label providers typically rely on this large size to provide necessary security features. The shipping label's large size provides the room needed for fraud detection features provided on the label itself. For example, within the four corners of the shipping label is usually included the billing number described above, address information, insurance information, delivery confirmation information, among other information which is scannable and/or human readable. The compilation of all this information is used in after-printing fraud detection. Because the shipping label has a large enough surface area to include a large amount of information, after-printing fraud detection is easier and pre-printing security less is important. Granted, shipping labels' large size provide the advantage of after-printing security detecting; however, the large size generally prevents shipping labels from being printed on envelopes, postcards, and small labels. Therefore, a disadvantage of shipping labels without VBI is that they cannot easily be used to mail postcards, letters, cards, and other smaller mail pieces because the large amount of information typically required for shipping labels cannot fit within the surface area of a smaller mail piece.

In contrast to shipping labels without VBI, VBI are much smaller in size. VBI are traditionally small enough to fit easily onto an envelope or postcard. Due to this small size, there is less surface space within a VBI to include post-printing security features in the VBI itself as compared to traditional shipping labels. For example, a user may desire to print VBI that does not have enough room to include billing numbers, address information, insurance information, delivery confirmation information within the four corners of the indicia. Therefore, providing pre-printing security is often very important when printing VBI. It is the need for this pre-printing security which has traditionally prevented the use of general purpose interface applications for printing VBI.

BRIEF SUMMARY OF THE INVENTION

The present invention is directed to systems and methods which restrict the use of Value Bearing Indicia (VBI) such that a general purpose interface application can be used to securely and/or precisely print VBI. A method and/or system of embodiments of the invention, includes a general purpose interface application being operated on a general purpose processor to request VBI, and in response to that request, receiving a content object comprising both the VBI and defined parameters which are controlled such that the general purpose interface application's use of the VBI is restricted.

Another embodiment of the present application involves a user utilizing a general purpose interface application (e.g. a web browser) operating on a general purpose processor (e.g. a personal computer) to request from a website hosted by a secure remote server a VBI. In response to the request, the web browser receives from the website a content object comprising the requested VBI and defined parameters. Control is maintained such that the web browser and/or the general purpose computer cannot change the content object's defined parameters. Further, the parameters prevent the web browser and/or general purpose computer from displaying, copying, storing, saving, and/or forwarding the VBI. Moreover, the web browser and/or general purpose processor is prevented from printing the VBI multiple times, and/or preventing the web browser from affecting the precise printing location of the VBI.

Another embodiment of the present invention makes use of a content object created by a content object generating application, such as ADOBE ACROBAT™ (available from Adobe Systems Incorporated) or XPS™ (XML paper specification open standard driven by Microsoft) or the like. The content object provides the layout control desired for printing the indicia on a label, label sheet, envelope, postcard, and/or any other medium wherein indicia can be printed thereon. The content object comprises the VBI which will be printed and parameters defined by the remote server and/or a website which could limit the user's ability to control the number of times the VBI can be printed, display of the VBI on user's screen, saving of the VBI, copying of the VBI, any other uses of the VBI, and/or the ability to access or change the parameters.

From the user's perspective, the user employs a general purpose processor's general purpose browser to log onto a secure website hosted by a remote server to request VBI according to an embodiment of the invention. If the user has selected the type, amount, and value of VBI he desires to print, the user could request the VBI be printed by sending a print request to the server. In response to that request, the server directs the content object generating application to create a content object comprising at least (1) the VBI and (2) defined parameters controlling the use of the VBI which are restricted such that the browser cannot change the defined parameters. Then, the server could send the content object to the general purpose browser which could automatically print the VBI without displaying the VBI to the user or allowing the user to control some or all aspects of the print job. Alternatively, if the VBI provider does not want to send the content object to the general purpose browser, the server could send the general purpose browser a link or pointer to the location where the content object is stored.

In an embodiment of the invention, the general purpose browser is prevented from controlling some or all of the aspects of the print job once the print request has been sent including the location of the print job on a print medium. To ensure the VBI are printed in the correct location and orientation within a document, the content object could include parameters controlling the location for printing the VBI. Because the content object's parameters are controlled such that the general purpose browser cannot change the parameters of the content object, the browser will be prevented from introducing arbitrary boundaries when printing the VBI. As a result, the VBI will be printed in the precise location defined by the content object's parameters allowing for precise printing on label sheets, envelopes, postcards, etc.

Because the printing parameters are defined before the general purpose browser receives the content object, the user may lose some desirable print options. For example, after the VBI has been requested, the user may not be able to control which printer prints the VBI. If the user desires to print to a particular printer, the system could allow the user to select a specific printer to print the VBI before the print request is sent. When the user is navigating the website and considering various VBI options (e.g. how many VBI, the value of each VBI), the user could select an option giving the remote server and/or website access to a list of the user's printers. If access is allowed, the content object could gather a list of printers from the user's computer and send a message to the remote server and/or website including that list. Having the list of printers, the server and/or website could allow the user to select which printer will print the VBI. After selecting a printer, the user could request the VBI be printed, and the content object could be sent to the user's computer which could automatically print the VBI on the selected printer without allowing the user to change the print options.

Embodiments of the present invention allow for secure and precise printing of VBI on a general purpose processor which does not have installed thereon specialized metering software and/or hardware. Rather, the general purpose computer can request the VBI, receive the content object, and print the VBI all without utilizing or having to install specialized metering software and/or hardware.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
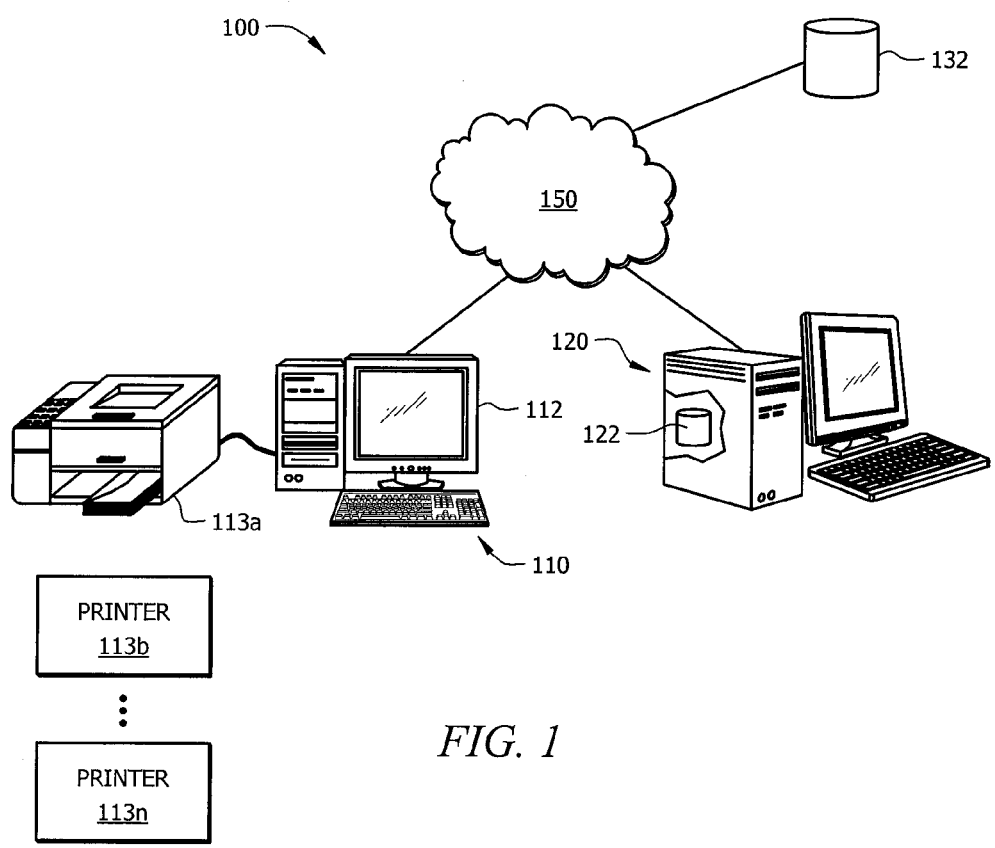
FIG. 1 shows a system adapted to provide controlled use of requested value bearing indicia.

An embodiment of the invention is shown in FIG. 1 wherein system 100 is adapted to facilitate request and/or printing of Value Bearing Indicia (VBI) using a general purpose interface application which maintains control of the VBI. System 100 comprises a user terminal 110 (e.g. general purpose computer, PDA, cellular phone, media device, or any other general purpose processor based system capable of hosting a general purpose interface application as described herein) in communication with a VBI provider's server 120 via network 150. Server 120 could be local or remote from user terminal 110, and network 150 could be any type of network, including but not limited to a public switched telephone network (PSTN), a local area network (LAN), a wide area network (WAN), the Internet, a wireless network, a cable transmission system, a satellite communication network, and/or the like and any combination of networks thereof. Accordingly, server 120 and user terminal 110 could communicate through landlines, wirelessly, or any combination thereof. Moreover, in the absence of a network, server 120 and user terminal 110 could communicate through the use of portable memory storage devices (not shown) including but not limited to flash drives, disks, memory buttons, external hard-drives, and any combination thereof.

Server 120 preferably comprises a processor-based system such as a computer having a central processing unit, memory, input/output devices, and interfaces, operable under control of an instruction set (e.g. code) defining the operations therein. The server could further comprise memory and may include database 122 and/or may be in communication with remote database 132.

User terminal 110 preferably comprises a processor-based system such as a general purpose computer having a central processing unit, memory, and input/output devices and is operable under control of instruction sets (e.g. code) defining the operations therein. Among the numerous output devices is display 112 for displaying information and printers 113a-113n (any of which may comprise an inkjet printer, laser printer, a thermal transfer printer, a dot matrix printer, a label printer, an envelope printer, etc.) for outputting content on a printing medium. User terminal 110 may also comprise a reader (not shown) adapted to read portable memory storage devices including but not limited to flash drives, disks (e.g. digital video disks, compact disks, floppy disks), memory buttons, external hard-drives, and any other portable memory storage device.

User terminal 110 of the illustrated embodiment could also comprise a general purpose interface application (not shown, but stored in memory of user terminal 110) such as a browser (e.g., INTERNET EXPLORER™ available from Microsoft Corporation, NETSCAPE™ available from Netscape Communications, SAFARI™ available from Apple Inc., and FIREFOX™ available from Mozilla Corporation). The general purpose interface application can be utilized by user terminal 110 to access various content, whether stored locally or remotely, as is well known in the art. For example, the general purpose interface application may be used to access content generated and/or stored by server 120, as described herein.

Embodiments of the present invention will be described herein with respect to protecting content in the form of a value bearing indicia (VBI) in order to provide examples for facilitating an understanding of the concepts of the present invention. Accordingly, server 120 may comprise a remote postage server wherein a general purpose browser of user terminal 110 interacts with server 120 for generation and printing VBI (e.g. information based postage indicia (IBI) utilized by the Untied States Postage Service (USPS)). Of course, other forms of content may be provided protection according to embodiment of the invention. For example, content provided by online references (or through a portable memory device) such as music, books, newspapers, tickets, transcripts, email, instant messages, or photographs could be provided to user terminal 110 for controlled outputting (e.g. printing, displaying, playing). Likewise, different forms of user interface applications in existence now or in the future such as a word processor, photograph application, multimedia application, document reader application, or the like may be used according to embodiments of the present invention.

Figure 2:
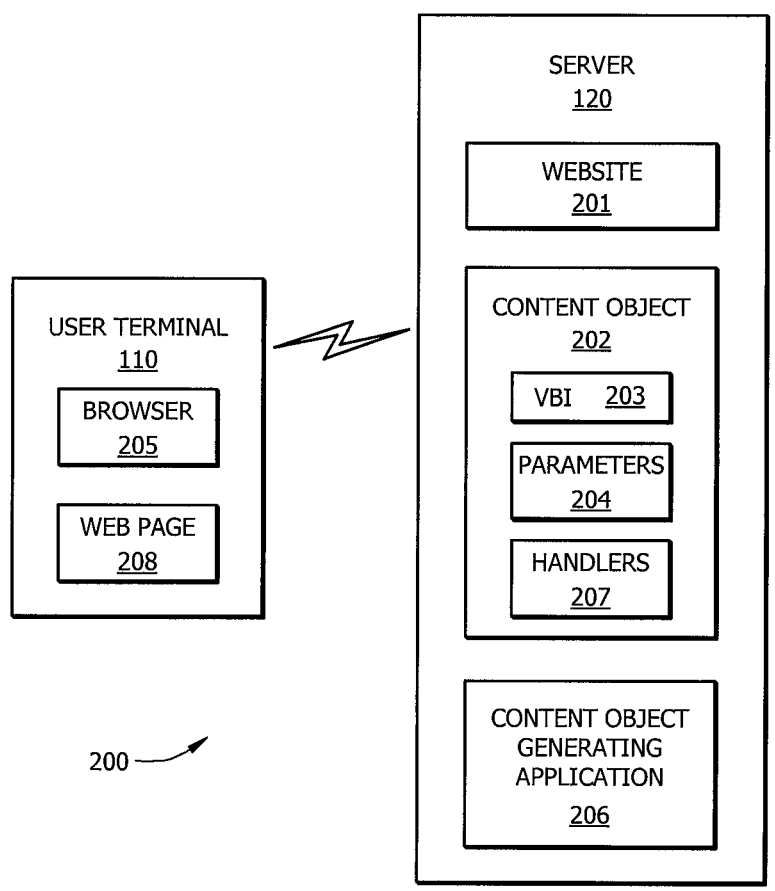
FIG. 2 shows a functional block diagram of a system adapted to provide controlled use of requested value bearing indicia.

Referring to FIG. 2, an embodiment of the invention is shown in system 200. User terminal 110 comprises a general purpose interface application such as a browser 205 displaying web page 208. The user utilizes browser 205 to communicate via network 150 with server 120. Server 120 interfaces with browser 205 using an interfacing application operable under control of server 120. By way of example, the interfacing application can be website 201; however, the interfacing application operable by server 120 is not so limited because the interfacing application could be any application capable of interfacing with a general purpose processor and providing content objects as described herein.

Embedded in website 201 of the illustrated embodiment is content object generating application 206 which is capable of generating content object 202. Some examples of content object generating applications include but are not limited to ADOBE ACROBAT™ provided by Adobe Systems Incorporated, XPS™ (XML paper specification open standard driven by Microsoft) provided by Microsoft Corporation and some examples of content objects include but are not limited to PDF files, XPS files, Microsoft document files. Content object generating application 206 can generate a content object 202 and embed content object 202 in website 201. Content object generating application 206 can include handlers 207 within content object 202 by embedding code, script, modules, macros, and/or the like into content object 202 which create handlers 207. As will be explained in further detail below, handlers 207 can be used to handle messages between website 201, content object 202, and user terminal 110.

In an embodiment of the invention, the user may request VBI be printed. In doing so, the user can utilize browser 205 to log into and communicate with website 201. If logged into website 201, the user may navigate website 201 in order to generate or otherwise acquire the VBI the user desires. Website 201 can be customized in any number of ways to provide an unlimited variety of VBI choices such as VBI for any value, for any postal class, for use in any zip code, city, state, or country, for any delivery date, for a delivery date in the future, and/or for any carrier. Further, the VBI could be customized to include photographs, pictures, advertisements, graphics, and/or any combination thereof. Further the VBI could comprise of human readable portions, machine readable portions, scannable portions, visible portions, invisible portions, and/or any combination of thereof. Further still, the VBI could be a plurality of indicia to be printed on a plurality of envelopes, postcards, a sheet comprising a plurality of labels, and/or a plurality of label sheets. VBI comprising a plurality of indicia could comprise of a plurality of multiple similar indicium (e.g. the same value, dates, and/or destination locations), or could comprise of a plurality of differing indicium (e.g. differing value, differing dates and/or differing destination locations), and/or any combination thereof. Moreover, a VBI comprising a plurality of indicia could all be printed on the same printing medium (e.g. envelopes, postcards, sheet of labels, label sheets) or could be printed on any combination of printing mediums. For example, a VBI could comprise of five indicia of $1.00 value, three of which are printed on envelopes and two of which are printed on a label sheet, and also comprise of seven indicia of $2.57 value of which four are printed on a sheet of labels and three are printed on envelopes. If desired, server 120 could be operable to select some or all aspects of the indicia for the user, so the user would not have to make the selections.

When choosing the desired indicia, the user can view invalid sample indicia (non-value bearing indicia) using display 112 and print invalid sample indicia (non-value bearing indicia) on the various printing mediums using printer 113a or any other printer (e.g. printer 113b-113n). In displaying and/or printing the invalid sample indicia (non-value bearing indicia), the user is able to verify the selected printer is operating properly and the aspect of the indicia is as the user expected. The VBI provider could provide sample indicia (for example non-value bearing indicia or void indicia) to the user for a charge or for no charge.

Once the user has selected the desired VBI which may include the number of indicia, the value of each indicia, the expiration date of each indicia (whether in the present or in the future), the design of each indicia, the size of each indicia, the printing medium of each indicia, etcetera, the user can indicate this decision to website 201 via browser 205. Website 201 can then give the user the opportunity to print the VBI.

If the user requests the selected VBI be printed, user terminal 110, server 120, and/or website 201 can account for the selected VBI. Accounting could comprise of debiting a user account which may be stored in server database 122, in remote database 132, and/or any other location (e.g. in a memory coupled to user terminal 110). Alternatively, accounting could comprise of documenting the print request and charging the user at a later time for the selected VBI. An example of charging the user at a later time is charging the user after posting of the VBI as described in U.S. patent application Ser. No. 11/353,690 entitled "SYSTEM AND METHOD FOR VALIDATING POSTAGE" filed on Feb. 14, 2006, which is incorporated herein by reference. Alternatively, accounting could comprise of a credit card or other transaction (e.g. a PAYPAL™ transaction) wherein website 201 or another website requests the user's credit card, debit card, gift card, electronic check, or the like and charges the user's payment card for the selected VBI either upon printing or at a later time.

If the user indicates to website 201 the selected VBI should be printed, website 201 could update the web page such that content object 202 comprising handlers 207 further includes the user selected VBI 203 and defined parameters 204. Alternatively, content object generating application 206 could generate a second content object comprising the user selected VBI 203 and defined parameters 204. Content object 202 comprising VBI 203 and parameters 204 could be stored in database 122, database 132, or any other location selected by the VBI provider either temporarily or for an extended period of time. Content object 202 could be sent to browser 205 for printing. Alternatively, website 201 could send browser 205 a pointer or link to the location that content object 202 is stored such that browser 205 pulls content object 202 from its storage location for printing. Because content object could be stored local or remote to server 120, VBI 203 may point to a location at server 120 and/or a location remote from server 120.

When generating content object 202 at server 120, website 201 can incorporate the indicia specifications selected by the user as described above (e.g. the indicia value, number of indicia) to create VBI 203. Further, if desired, the website can select some or all aspects to be used in creating VBI 203, so the user does not have to select each aspect of VBI 203. For example, if the user does not choose a graphic for the indicia, website 201 could select a graphic for the indicia, and that website selected specification could be used in creating VBI 203.

Further, when generating content object 202, parameters 204 could be defined according to information input by the user (e.g. which printer should print the VBI), as will be explained further below. Alternatively, the website could utilize established parameters used to generate parameters 204. Then again, information could be retrieved from user terminal 110 and used in defining parameters. Further, parameters 204 could be defined using any combination of user input information, established parameters, or retrieved user terminal information.

Parameters 204 of the illustrated embodiment are defined to control how an entity uses content object 202 and/or VBI 203. For example, parameters 204 could be defined to prevent browser 205 from displaying content object 202 and/or VBI 203. One way of preventing VBI 203's display is by setting content object 202's display widow at zero inches high and zero inches wide. Furthermore, parameters 204 could be defined to prevent browser 205 from saving content object 202 and/or VBI 203, copying content object 202 and/or VBI 203, pasting content object 202 and/or VBI 203, and/or forwarding content object 202 and/or VBI 203. One way of restricting these uses of VBI 203 is by disabling browser 205's saving, copying, pasting, and/or forwarding features.

Any number of other uses of content object 202 and/or VBI 203 can be controlled by parameters 204.

Furthermore, parameters 204 could be defined to control how and where VBI 203 is printed. For example, parameters 204 could control which printer prints VBI 203, how many times a printer prints VBI 203, the dimensions of VBI 203, the headers and/or footers of VBI 203, whether headers and/or footers could be added to VBI 203, the precise location on a printing medium VBI 203 will be printed, the printing medium upon which VBI 203 will be printed, the number of printing mediums upon which VBI 203 will be printed, the orientation with which VBI 203 will be printed on a printing medium. Parameters 204 could be defined such that VBI 203 is only printed a single time. Parameters 204 could be defined to control any aspect of the displaying, viewing, printing, saving, storing, copying, pasting, forwarding, use, modification, and/or manipulation of content object 202 and/or VBI 203.

Parameters 204 could be defined to be inaccessible and/or unchangeable. For example, parameters 204 could be defined such that browser 205 can not access and/or change parameters 204. Alternatively, content object 202 can be defined such that no entity other than certain trusted entities (e.g. website 201, server 120) can access and/or change parameters 203. Further, parameters 204 could be defined such that no entity at all, including content object generating entity 206 and/or website 201 could access and/or change parameters 204 once the parameters are defined.

In another embodiment of the invention, content object 202 may be embedded in website 201 before the user selects any indicia. If content object 202 already exists, then when the user indicates to website 201 the selected indicia should be printed, website 201 could instruct content object generating application 206 to generate a second content object (not shown) for that print request as described above.

Alternatively, rather than generating a new content object, website 201 could update content object 202 according to the print requests. Content object 202 could be updated to comprise VBI 203 and parameters 204, as described above. For example, content object 202 could be updated to include VBI 203 comprising the selected indicia, as explained above. Likewise, parameters 204 (e.g. restricted display, copying, printing, saving) and content object 202 could be updated to comprise of defined parameters 204 which are inaccessible and/or unchangeable as discussed above.

Handlers 207 could also be adapted to handle website 201's requests to retrieve information from user terminal 110. For example, if website 201 wants a list of the printers available at user terminal 110 (e.g. prints 113*a*-113*n*), website 201 could send content object 202 with handler 207 for a get-printers message to Browser 205. The web page 208 running on Browser 205 sends a get-printers message to handler 207 on the Browser 205 which causes content object 202, running on the browser 205, to obtain a list of user terminal 110's printers (e.g. as a tab-separated string) and send that information back to website 201. With a list of user terminal 110's printers, website 201 could incorporate the printer list into one of the many options offered to the user by website 201 and allow the user to select which of those printers prints VBI 203.

As explained above, parameters 204 can be defined such that VBI 203 is printed to a certain printer. Further, parameters 204 can be defined using user input. Therefore, while the user is making selections regarding the indicia, the user could select which printer from the list printers prints VBI 203. Thereafter, when the user requests VBI 203 be printed, parameters 204 could be defined such that the user-selected printer prints VBI 203.

Handlers 207 could also pass messages from content object 202 to web page 208. For example, content object 202 could send a message to web page 208 indicating the status of the print job (e.g. indicating that printing is in progress, printing is complete, printing is in error). This information can be used by web page 208 in various ways including disabling the Print Button (see print button 504 on FIG. 5), navigating to another page, informing server 120 that VBI 203 has been printed, informing server 120 that the print job was unsuccessful, storing information regarding the printing for future accounting purposes, deleting information from user terminal 110, database 122, database 132, and/or server 120, obscuring or deleting pointers or links, etcetera.

In another embodiment of the invention, content generating application 206 can be Adobe Acrobat and content object 202 can be a PDF file comprising handlers 207 which are in the form of JavaScript code. In this example, the user has selected the desired indicia (as explained above) and is presented with a web page giving the user the option to print the selected indicia. If the user selects the print option provided by the web page, then the website 201 uses the content object generating application 206 to create a new content object 202. The user's indicia selections are used when generating VBI 203 and some parameters 204. Website 201 also creates handlers 207 to control the behavior when the content object 202 is loaded into the browser 205.

Web page 208 is then refreshed or updated to include the updated version of the PDF which includes VBI 203 and parameters 204; therefore browser 205 now has downloaded thereon the PDF. Parameters 204 of the PDF maintain control of the PDF (as explained above) and cause VBI 203 to be printed according to those parameters. For example, once the updated PDF is downloaded to onto browser 205, parameters 204 are defined such that one indicia is immediately printed on a sheet of labels. Upon load, web page 208 immediately sends a print message to handlers 207 which causes content object 202 to print without displaying any user interface.

After the printing is complete, the web page is refreshed again and no longer includes the PDF comprising VBI 203 and parameters 204. Therefore, browser 205 no longer has access to the PDF (comprising the VBI) and cannot use the PDF (comprising the VBI) in any undesired way.

Figure 3:
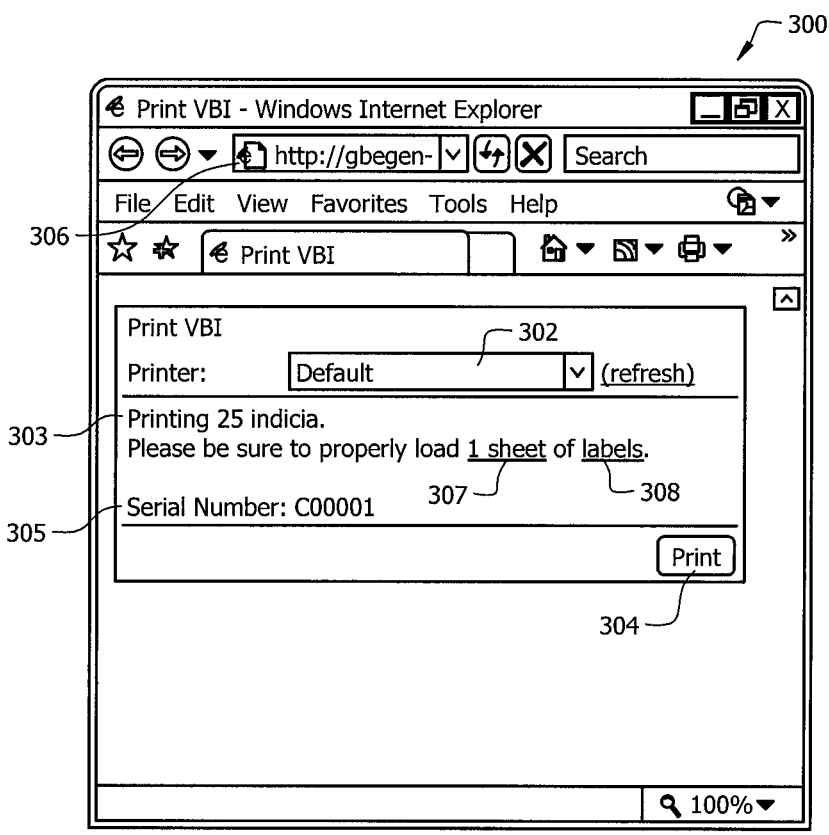
FIG. 3 is an example web page as seen from the user's perspective.

Referring to FIG. 3, an example of an embodiment of the invention from the user's perspective is illustrated. In this example, the user has utilized browser 205 to navigate website 201 operable under control of server 120. Web page 300 with URL address 306 has been presented to the user to verify the user's selection. The user in this example has selected a number of indicia 303 (e.g. 25 indicia) with identifier 305 (e.g. Serial Number: C0001), to be printed on printing medium 308 (e.g. sheet of labels), on a number of printing mediums 307 (e.g. one sheet of printing medium), and did not select a printing printer 302. When generating content object 202, the website can use the user input information (e.g. number of indicia 303, printing medium 308, and selected printing printer 302) and established parameters (e.g. the number of print jobs, the ability to save/copy) when generating content object 202 and the VBI 203 and parameters 204 therein. Because the user in this example has not selected a specific printer to print the indicia, web page 300 will define parameters 204 such that selected indicia are printed to the user's default printer 113*a*.

The embodiment shown in FIG. 3 does not display the indicia to the user thereby providing some level of protection with respect to printing (e.g. screen printing), copying, etc. of the indicia. Additional or alternative techniques may be used to provide protection according to embodiments. For example, some embodiments of the invention, the indicia could be displayed to the user while handlers 207 disable browser 205 functions, such as (FILE|PRINT), thereby preventing undesired use of the displayed VBI.

If the user does not want the selected indicia, then the user could choose not to select the print option, and as a result, content object 202 (comprising VBI 203 and parameters 204) may not be generated and/or updated, selected indicia may not be printed, and the system may perform no accounting regarding the selected indicia. Website 201 may optionally save the selections made by the user (e.g. the number and/or type of selected indicia).

If the user wants to print the selected indicia, the user can select the print option by selecting print button 304. In this example, once the user selects print button 304, print button 304 is disabled. Disabling print button 304 prevents the user from duplicating the order more than one time, because once the print button 304 is selected a single time, it cannot be selected again.

Figure 4:
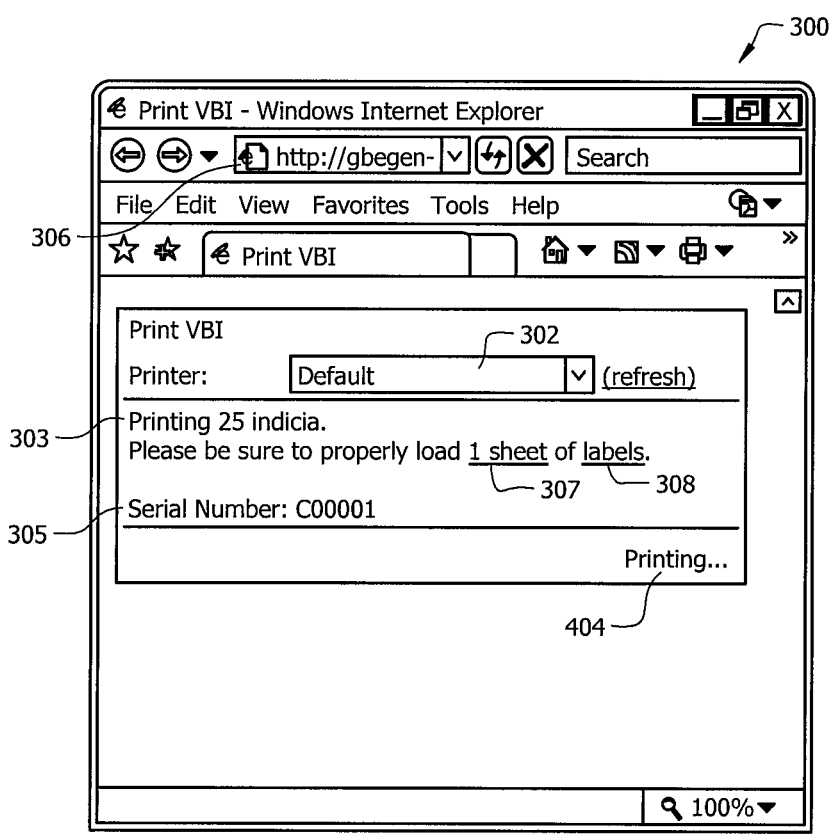
FIG. 4 is an example web page as seen from the user's perspective.

Now referring to FIG. 4 which depicts what the user sees after the print button 304 in this example has been selected. In place of print button 304 is progress text 404 indicating to the user that printing is in progress. While progress text 404 is displayed, the printer can be printing VBI 203. If a specific printer had previously been selected, then the selected printer could be printing VBI 203, but because a specific printer was not selected in this example, VBI 203 is being printed on a default printer. While printing is in progress, VBI 203 is not shown on display 112; thus, the user has no opportunity to copy or paste VBI 203. In this example, while printing is in progress, VBI 203 is not accessible by the user; thus the user cannot copy, save, forward, or modify VBI 203. From the user's perspective, there is no indication that content object 202 is being used.

Although hidden from the user, when progress text 404 is displayed, content object 202 is being generated or updated as explained above to include VBI 203 and parameters 204. In this example, VBI 203 comprises 25 individual indicium which will be printed on a sheet of kiss cut labels. VBI 203 may also comprise aspects selected by the website such as graphics, a machine readable portion, a meter number, etc. Parameters 204 of embodiments can comprise one or more of the following: a number of indicia 303 (e.g. 25 indicia), printing medium 308 (e.g. sheet of labels), a number of printing mediums 307 (e.g. one sheet of printing medium), and printing printer 302 (e.g., default printer). Parameters 204 may also include parameters not selected by the user. For example, VBI 203's window display parameter can be set at zero inches high and zero inches wide (to prevent viewing and/or copying of VBI 203), and a parameter could disable web page 205's printing options (to prevent unauthorized printing of VBI 203).

In this example, from the user's perspective, all the user sees is web page 400 showing progress text 404 and the printer printing the VBI 203. Preventing user access to the behind the scenes operations helps provide the desired security to allow a general purpose browser and website facilitate VBI printing.

Once printing is complete, web page 400 can refresh and replace progress text 404 with disabled printer button 304. With print button 304 disabled, the user can be prevented from printing the selected VBI 203 additional times. Alternatively, the website could automatically navigate the user to a different web page.

Figure 5:
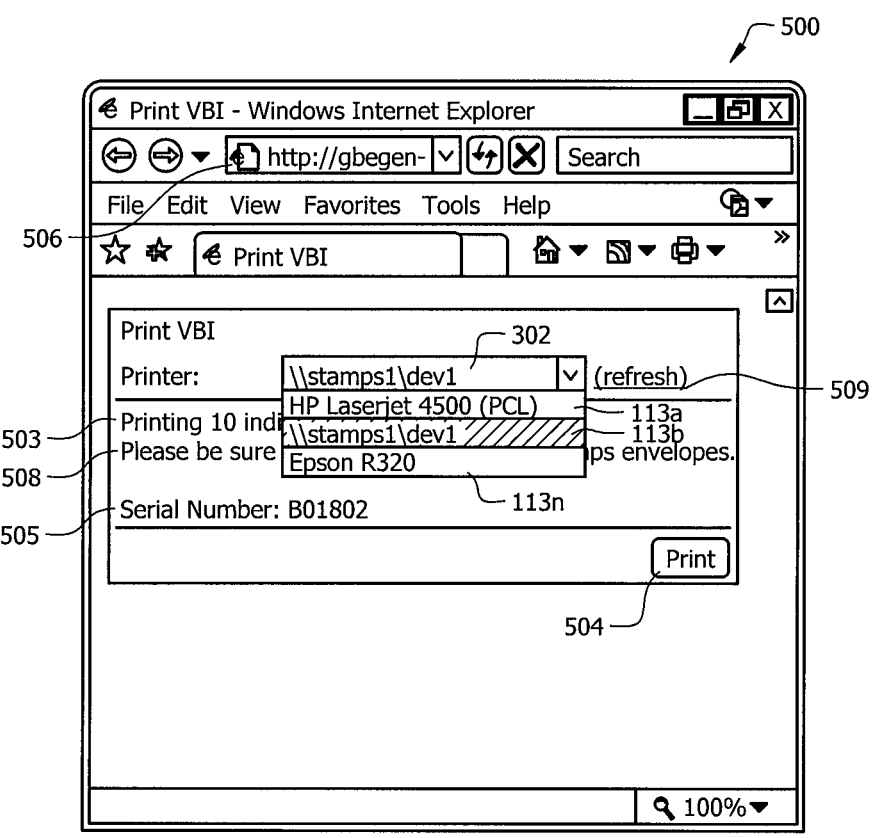
FIG. 5 is an example web page as seen from the user's perspective.

FIG. 5 shows an embodiment of the invention from the user's perspective wherein the user has the choice of which printer will print VBI 203. As explained above, at user terminal 110, the user has used browser 205 to communicate with website 201 operable under control of server 120. Web page 500 with URL address 506 is then presented to the user which verifies the VBI selected by the user. For example, the user in this case has selected a number of indicia 503 (e.g. ten indicia) with identifier 505 (e.g. Serial Number: B01802), to be printed on printing medium 508 (e.g., envelopes) on a number of printing mediums (not shown) (e.g. ten envelopes). In this example, the user allowed website 201 access to a list of printers available at user terminal 110 (e.g. printers 113a-113n).

Website 201 can be allowed access to the list of printers in various ways. For example, the user could select the (refresh) link 509 which causes website 201 to message handler 207 causing content object 202 to retrieve the list of printers from user terminal 110. The content object (without the VBI) is downloaded to the browser and the handlers run to determine the printers. Content object 202 could then send a message to website 201 including the list of printers. Alternatively, web page 500 could include a choose-from-printers-button (not shown) which is selected by the user and causes the same or a similar chain of events.

Once website 201 has a list of user terminal 110's available printers, website could incorporate the list into a drop down menu on web page 500. The user could utilize the drop down menu to view the printers and select a printer. In this case, the user selected printer 113b. After selecting a printer, the user could select the printer button 504, and the print request could be sent to website 201. If printer 113b was selected, then content object generating application 206 could create or update content object 202 with parameters 204 including a parameter requiring VBI 203 be printed by printer 113b. When browser 205 receives content object 202, browser 205 has no ability to change defined parameters 204, so VBI 203 will be printed according to parameters 204 including the parameter requiring printer 113b print the VBI 203.

Figure 6:
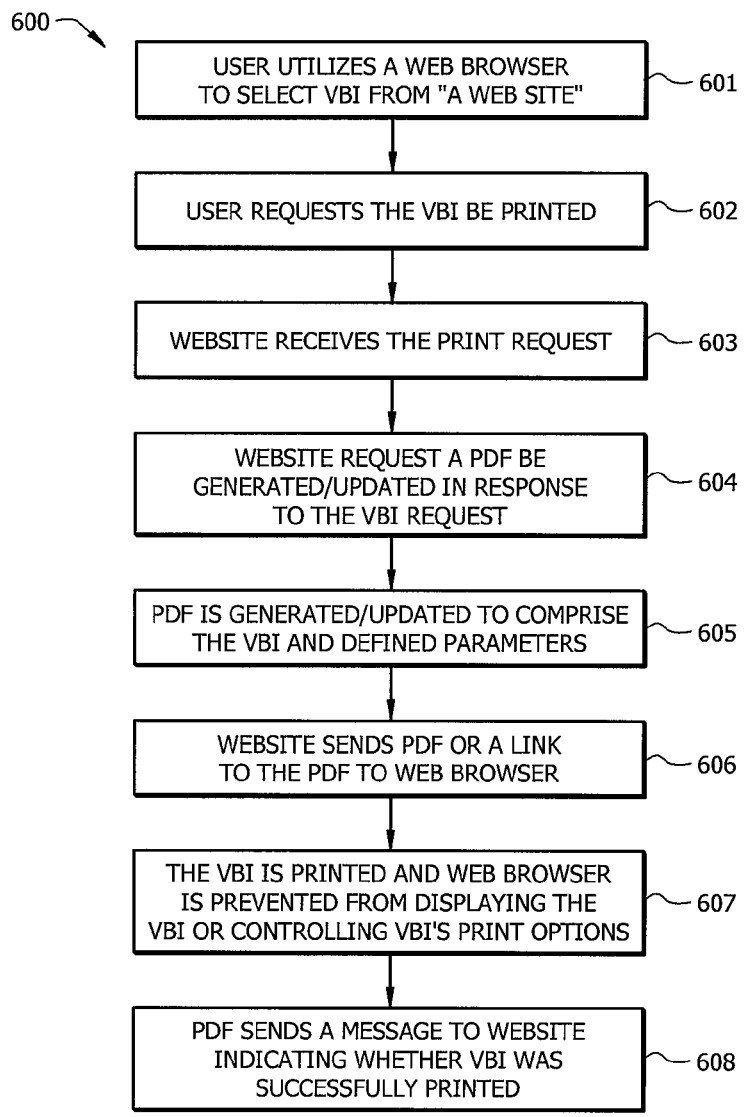
FIG. 6 is a flow chart of an example system adapted to provide controlled use of requested value bearing indicia.

FIG. 6 shows a flowchart for an embodiment of the invention. At step 601, the user utilizes a web browser to access a website available online which offers indicia. After navigating the website's indicia options, the user selects the VBI he desires. Once, the VBI selection is complete, the user arrives at a web page offering to print the VBI. Before requesting to print, the user can optionally give the website access to a list of the user's printers. If the list of printers is provided to the website, then the user can select which of the printers will print the VBI. The list of printers can be stored by the server and used again in future VBI transactions so the user need not repeat this process in the future.

At step 602, all selections have been made and the user requests the VBI be printed. The website may be designed such that print request can only be made using the links or buttons provided by the website and no request to print indicia can be made using print options provided by the browser (e.g., FILE|PRINT or CTRL|P). At step 603, the VBI print request is received by the website. At step 604, the website directs that content object be generated or updated.

At step 605, the content object is generated or updated comprising the requested VBI and defined parameters restricting the browser's use of the VBI. The parameters can be defined such that the browser is prevented from displaying the VBI at the user terminal. The parameters can also be defined such that the VBI is immediately printed upon receipt at the browser and disables the browser's ability to control the printing of the VBI. Further, the parameters could also prevent the VBI from being copied, forwarded, saved, or stored. Further still, the parameters control which printer prints the VBI. The parameters could also define the precise location upon a printing medium the VBI is printed, so the browser cannot add headers, footers, or otherwise misplace the printing location defined by the parameters. The parameters could also be defined such that they cannot be accessed, controlled, or changed by the browser and/or any other entity, so the user and/or browser cannot alter the defined number of prints, the location of printing, the viewing of the VBI, or any other aspect of the content object.

At step 606, the website sends the content object to the browser. Alternatively, at step 606 the website could send the browser a link or pointer to the location of the content object. At step 607, the VBI is immediately sent to the printer for printing according to the defined parameters, and the browser is prevented from copying, displaying, saving, storing, or forwarding the VBI. Moreover, the browser is prevented from printing more then one copy of the VBI or controlling any of the VBI print options.

At step 608, the content object sends a message to web page 208 indicating whether the VBI has been printed. In this example, the message indicates a successful print job. With this information, web page 208 can do an accounting and take security steps to ensure the VBI cannot be fraudulently used. Examples of such steps include communicating from web browser to the website causing it to delete a stored VBI, preventing the browser from future access to the VBI, obscuring links or pointers to a stored VBI, noting the use of the VBI in a database so it cannot be used more than once, and noting the serial number of the VBI so it can be tracked and/or the user can later be charged for the VBI. If the message indicated that the print job was unsuccessful, then steps alternatively could be taken such as flagging the misprinted content object in the local or remote database, issuing a refund, and/or replacing content object.

Figure 7A:
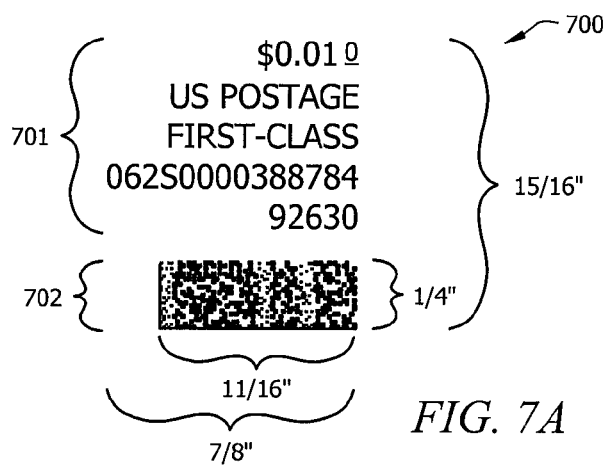
FIGS. 7A and 7B are examples of VBI lite.

Referring to FIG. 7A, an example of an embodiment of a VBI lite 700 is shown. The human readable portion 701 is optional and includes information which is readable by a person and or machine. The machine readable portion 702 includes information which is readable by a machine. A VBI Lite contains less information than an Full VBI and could be as small as $15/16$ inches by $7/8$ inches wherein machine readable portion 702 is as small as $1/4$ inches by $11/16$ inches and the human readable portion 701 (if included) comprises the rest of the area of the VBI lite. If the human readable portion 701 were omitted, the VBI lite could be as small as $1/4$ inches by $11/16$ inches. Of course, a VBI lite could be larger or smaller depending on the manner the information in the VBI is arranged.

Figure 7B:
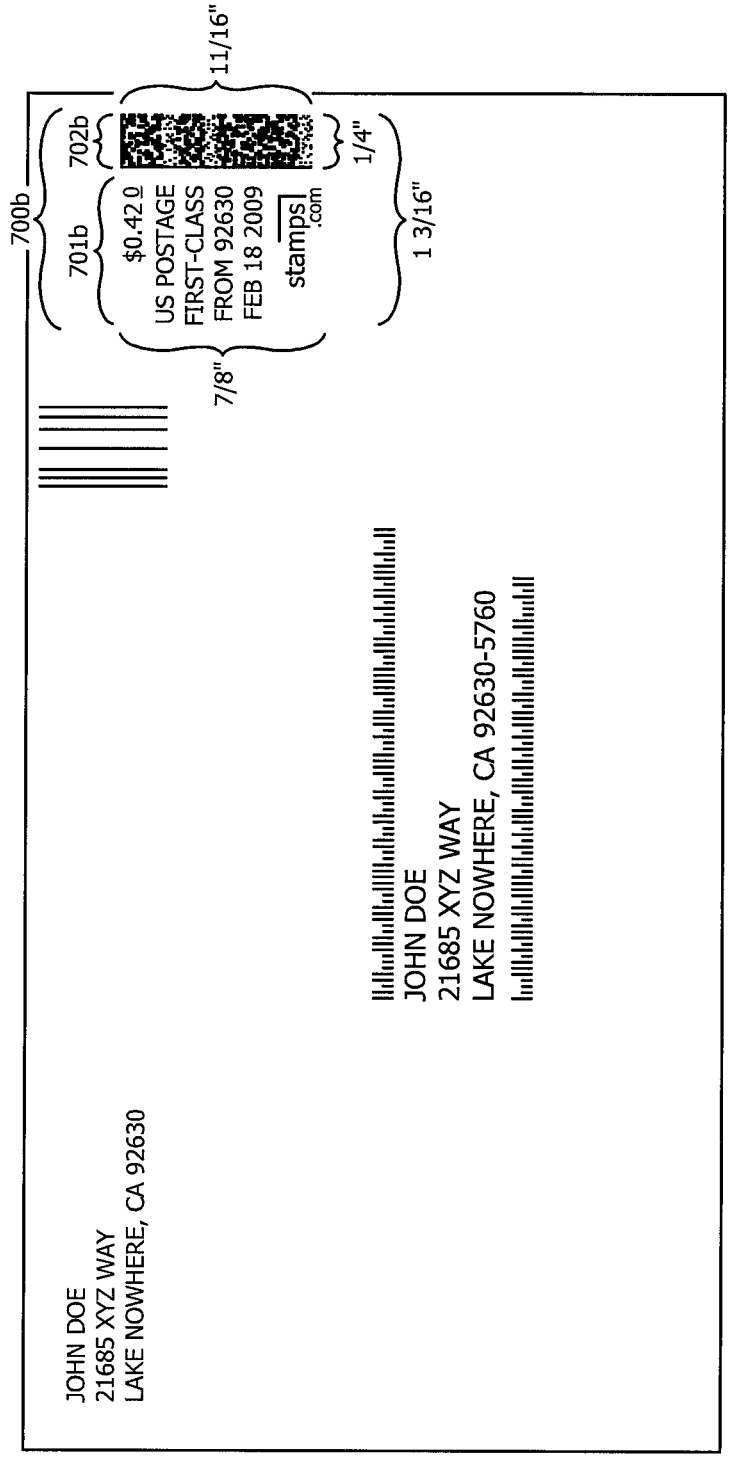

Referring to FIG. 7B, another embodiment of a VBI lite is 700b is shown attached or otherwise evidenced on an envelope. The human readable portion 701b is optional and includes verification information which is readable by a person or a machine. The machine readable portion 702b includes verification information which is readable by a machine.

Figure 7C:
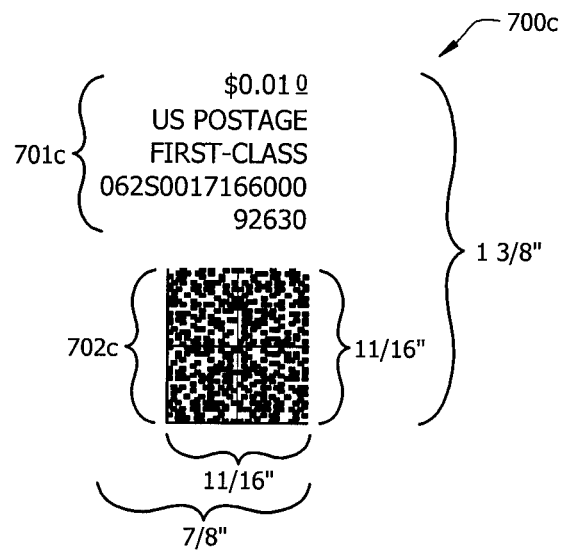
FIGS. 7C and 7D are examples of full VBI.

Referring to FIG. 7C, an embodiment of a full VBI 700c is shown. The human readable portion 701c is optional and includes information which is readable by a person and or machine. The machine readable portion 702c includes information which is readable by a machine. A full VBI 700c could be as small as $1 3/8$ inches by $7/8$ inches wherein the machine readable portion 702c is as small as $11/16$ inches by $11/16$ inches and the human readable portion 701c (if included) comprises the rest of the area of the full VBI. If the human readable portion 701c where omitted, then the VBI could be as small as $11/16$ inches by $11/16$ inches. Of course, a full VBI could be larger or smaller depending on the manner the information in the VBI is arranged.

Figure 7D:
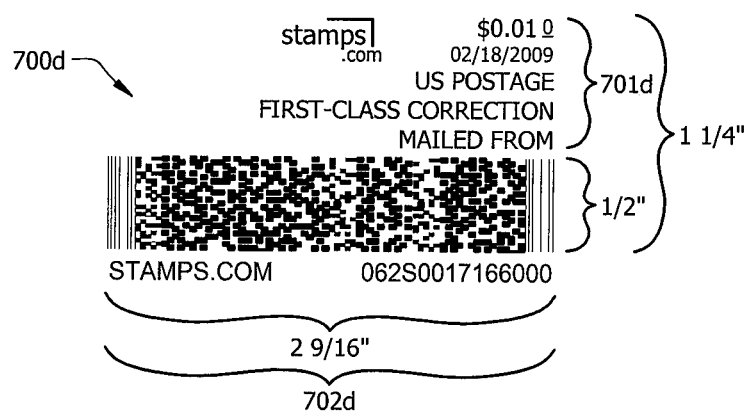

Referring to FIG. 7D, an embodiment of a full VBI 700*d* is shown. The human readable portion 701*d* is optional and includes information which is readable by a person and or machine. The machine readable portion 702*d* includes information which is readable by a machine.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    using a general purpose processor based system to request purchase of value bearing indicia via a general purpose browser;
    receiving, from a server in response to said purchase request, a content object comprising at least one content object parameter and a purchased value bearing indicia, wherein content object parameters restrict a use of said purchased value bearing indicia by said general purpose processor based system, wherein said restricting said use comprises preventing said general purpose browser from adding headers or footers when printing said purchased value bearing indicia, and wherein all printing options associated with the value bearing indicia are defined before the general purpose browser receives the content object; and
    using said content object to print, by a printer, said purchased value bearing indicia in accordance with said at least one content object parameter.

2. The method of claim 1 wherein said restricting said use comprises:
    preventing said general purpose processor based system from changing said content object parameters.

3. The method of claim 1 wherein said restricting said use further comprises:
    preventing said general purpose browser from introducing boundaries when said purchased value bearing indicia is printed on a printing medium.

4. The method of claim 1 wherein said restricting said use comprises: restricting said general purpose browser from printing said purchased value bearing indicia more than once.

5. The method of claim 1 wherein said restricting said use comprises:
    preventing said general purpose browser from displaying said purchased value bearing indicia.

6. The method of claim 1 wherein said restricting said use comprises at least one of:
    preventing said general purpose browser from saving said purchased value bearing indicia;
    preventing said general purpose browser from copying said purchased value bearing indicia; and
    preventing said general purpose browser from forwarding said purchased value bearing indicia.

7. The method of claim 1 wherein a website defines said content object parameters.

8. The method of claim 7 wherein said general purpose browser is a web browser.

9. The method of claim 7 wherein said content object is in portable document format (PDF).

10. The method of claim 1 wherein said restricting said use comprises:
    restricting copying of said purchased value bearing indicia.

11. A computer program product having computer executable code stored on a non-transitory computer readable medium, said computer program product comprising:
    code for receiving a purchase request at a website for value bearing indicia from a general purpose browser operating on a general purpose processor based system;
    code for restricting use of said purchased value bearing indicia by said general purpose processor based system, wherein said code for restricting comprises:
        code for defining at least one content object parameter, wherein content object parameters restrict use of said purchased value bearing indicia by said general purpose processor based system, wherein said defined parameters prevent at least headers or footers from being added to said purchased value bearing indicia, wherein said at least one content object parameter prevents said general purpose processor based system from defining a printing option associated with the value bearing indicia after the general purpose browser receives the content object, and wherein all printing options associated with the value bearing indicia are defined before the general purpose browser receives the content object;
        code for creating a content object comprising said at least one content object parameter and said purchased value bearing indicia; and
    code for sending said content object to said general purpose processor based system using said content object to print, by a printer, said purchased value bearing indicia in accordance with said at least one content object parameter.

12. The computer program product of claim 11 wherein said restricting use comprises:
    preventing said general purpose processor based system from changing said at least one content object parameter.

13. The computer program product of claim 11 wherein said restricting use prevents said purchased value bearing indicia from being printed more than once.

14. The computer program product of claim 11 wherein said restricting use comprises one of:
    allowing a print command to be selected no more than once; and
    preventing a selection regarding a number of copies from being set higher than one.

15. The computer program product of claim 11 wherein said restricting use prevents an introduction of boundaries when said purchased value bearing indicia is printed on a printing medium.

16. The computer program product of claim 11 wherein said defined parameters prevent said purchased value bearing indicia from being displayed.

17. The computer program product of claim 11 wherein said defined parameters control at least one of:
    preventing said purchased value bearing indicia from being saved by said general purpose processor based system;

preventing said purchased value bearing indicia from being copied by said general purpose processor based system; and preventing said purchased value bearing indicia from being forwarded by said general purpose processor based system.

18. The computer program product of claim 11 wherein said restricting use comprises:

restricting copying of said purchased value bearing indicia.

19. A system comprising:

a content object comprising purchased value based indicia and at least one handler for communication between a webpage and said content object, wherein said content object further comprises content object parameters, wherein said webpage uses said at least one handler to define at least one of said content object parameters, and wherein said defined content object parameters restrict use of said content object;

a general purpose processor based system operable to access said webpage, wherein a general purpose browser operating on said general purpose processor based system receives, from said webpage, said content object, wherein said general purpose processor based system is further operable to print, by a printer, said purchased value based indicia according to said defined content object parameters, wherein said restricting use of said content object comprises preventing headers or footers from being added when printing said purchased value bearing indicia, and wherein all printing options associated with the value bearing indicia are defined before the general purpose browser receives the content object.

20. The system of claim 19 wherein said restricting use of said content object comprises:

restricting copying of said purchased value bearing indicia.

21. The system of claim 19 wherein said restricting use of said content object comprises allowing said general purpose processor based system to print said purchased value bearing indicia only a single time.

22. The system of claim 19 wherein said restricting use of said content object comprises:

controlling a precise location said purchased value bearing indicia is printed on a printing medium.

23. The system of claim 19 wherein said restricting use of said content object comprises at least one of:

preventing said purchased value bearing indicia from being displayed by said general purpose processor based system;

preventing said purchased value bearing indicia from being saved by said general purpose processor based system;

preventing boundaries from being introduced when printing said purchased value bearing indicia;

preventing said purchased value bearing indicia from being copied by said general purpose processor based system; and preventing said purchased value bearing indicia from being forwarded by said general purpose processor based system.

24. The system of claim 19 wherein said content object retrieves a list of printers operable under control of said general purpose processor based system and sends a message to said webpage comprising said list of printers.

25. The system of claim 24 wherein said defined content object parameters require said purchased value bearing indicia be printed to a selected printer from said list of printers, wherein said selected printer is selected by a user.

\* \* \* \* \*